INVENTORS
D. M. Haskell and
D. L. McKay
BY
*Herron & Young*
ATTORNEYS

United States Patent Office 2,768,169
Patented Oct. 23, 1956

2,768,169

PURIFICATION OF POLYMERIZABLE HETEROCYCLIC NITROGEN COMPOUNDS AT LOW TEMPERATURES

Donald M. Haskell and Dwight L. McKay, Bartlesville, Okla., assignors to Phillips Petroleum Company, a corporation of Delaware Application June 22, 1953, Serial No. 363,248

10 Claims. (Cl. 260—290)

This invention relates to an improvement in the process for purification of heterocyclic nitrogen monomers which have a tendency to polymerize during purification. In one of its embodiments, this invention relates to an improvement in the process for the purification at relatively low temperatures of 2-methyl-5-vinylpyridine (MVP) or other vinylpyridine monomers which have a tendency to polymerize during purification. More specifically, the invention comprises the removal of polymers by phase separation at relatively low temperatures, said phase separation being accomplished by the addition of a solvent to the polymer-containing monomeric compound and said solvent having a relatively low critical solution temperature for the polymer.

In the preparation of heterocyclic nitrogen compound monomers, they are usually recoverd in admixture with raw material from the reactor. For example, vinylpyridines may be prepared from the corresponding ethylpyridines by passing the latter over an active high temperature dehydrogenation catalyst at temperatures between 450° C. and 800° C. The resulting mixture from the dehydrogenation vessel contains ethylpyridine, vinylpyridine, and small amounts of impurities.

When 2-methyl-5-vinylpyridine (MVP) is made from 5-ethyl-2-methylpyridine (MEP) by dehydrogenation, the resulting mixture contains, besides the major constituents MVP and MEP, small amounts of picolines and also some unidentified materials (probably divinylpyridines or other diolefins) which initiate the proliferous type of polymerization known to the art as popcorn polymer.

The mixture from the dehydrogenation step will contain approximately 30–35 percent MVP. This mixture is generally concentrated by fractionation under reduced pressures. Even so, practical consideration necessitates the operation of the fractionator at temperatures in the range of 200–220° F. which causes the MVP to form linear polymers at excessive rates and provides ideal conditions for the propagation of popcorn type polymers of the MVP. Most of this polymer formation in the fractionator can be eliminated by the introduction of sulfur, ditertiary butyl polysulfide, ditertiary butyl catechol or other polymerization inhibitors or retarders to the mixed pyridines being fractionated. This method of polymerization inhibition is favored by only partially removing the MEP and lighter materials by prefractionation, whereby the maximum temperatures used in the fractionator is somewhat reduced (180–200° F.) and the residence time therein is only ¼ to ½ that which would be required for complete concentration of the MVP. The MVP in the concentrate (70–80 percent MVP) formed by the less exhaustive prefractionation can be readily separated from the MEP by crystallization, liquid-liquid extraction or any other suitable means. However, the MVP will still contain some polymers which must be removed. These polymers are generally removed by flashing the MVP from the polymer at extremely reduced pressures. This flashing cannot be carried out to obtain substantially quantitative recovery of the MVP, since there is excessive polymerization when the kettle material is boiled for any length of time.

In discussing the prior art, we have discussed the preparation of 2-methyl-5-vinylpyridine (MVP), the monomer which is of particular commercial significance at the present time. The discussion is applicable to other alkene, and alkyne heterocyclic nitrogen compounds such as vinylpyridine and divinylpyridine, alkyl and alkenyl substituted vinylpyridines and divinylpyridines, where the substituted radical contains 1 to 4 carbon atoms, vinylquinoline, divinylquinoline, alkyl and alkenyl substituted vinyl- and divinylquinolines where the substituted radical contains 1 to 4 carbon atoms, and the like, and like alkene, alkadiene, and alkyne substituted pyridines, quinolines, isoquinolines, piperidines, pyrroles, pyrrolidines, and pyrrolidones. We have described the preparation of polymerizable compounds by dehydrogenation, however our invention to be described, is not limited to monomer mixtures prepared by this method, but is useful wherever it is desirable to remove soluble polymer from monomer mixtures.

We have provided a relatively simple method for removing the polymers formed in the prefractionator from the monomer concentrate and thereby making possible the recovery of the monomers in a substantially pure state.

We have found that the addition of a low boiling paraffin or cycloparaffin hydrocarbon (a hydrocarbon containing 3 to 6 carbon atoms being most satisfactory from an economical standpoint) to the bottoms product (monomer concentrate) from a prefractionator will precipitate the polymer formed during the prefractionation step. The precipitated polymeric material quickly agglomerates so that the liquid phase can be readily separated by decantation. The low boiling hydrocarbon can be stripped from the polymer-free monomer concentrate by flashing at reduced pressure, thereby yielding a dry polymer-free monomer concentrate.

As was hereinabove stated, we prefer to use a paraffin hydrocarbon containing 3 to 6 carbon atoms. Methane and ethane would be operable with those monomers having low freezing temperatures, however, the refrigeration and pressures required would make these compounds economically unattractive. The paraffins containing a higher number of carbon atoms (seven or over) would have boiling temperatures which would be apt to promote polymerization of the monomers during the subsequent stripping operation. Due to the low cost, we also prefer to use normal paraffins such as propane, butane, pentane and hexane. However, cyclic, alkyl substituted and isoparaffins are operable so long as we limit the number of carbon atoms to not more than 6.

Our invention can best be described by referring to the attached drawings, which are schematic, showing four embodiments utilizing our invention. Conventional apparatus such as pumps, compressors, valves and the like, are not shown but the inclusion of such are within the scope of our invention. In discussing the drawings, we will describe the purification of MVP, but as has been hereinabove pointed out, our invention is not limited to this monomer.

Figure 1:
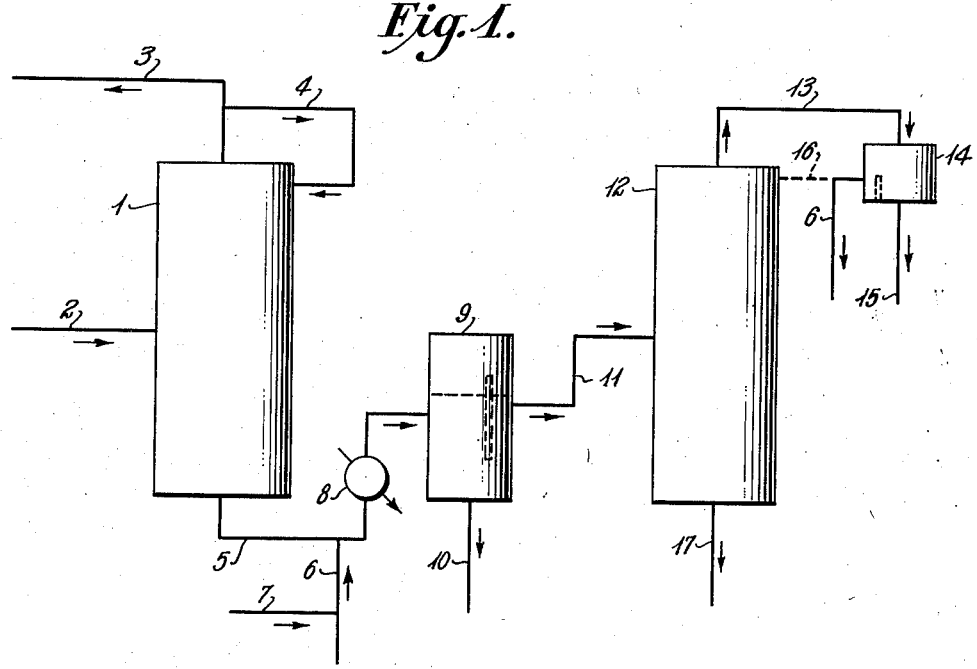
Figure 1 illustrates a process utilizing our invention in a reduced-pressure fractionation process.

Referring to Figure 1, a mixture of MEP and MVP containing 30–35 percent MVP from a dehydrogenation unit (not shown) enters the fractionator 1 through conduit 2. The fractionator is operated to produce essentially pure MEP as overhead product which is recycled through conduit 3 to the dehydrogenation unit. Reflux for the fractionator 1 is returned from conduit 3 via conduit 4. A bottoms product containing 90–95 percent MVP, 0.5–1 percent MEP, 2–5 percent polymer, and 1–3 percent water, along with a small portion of other impurities, is withdrawn through conduit 5. Approximately an equal volume of a low-boiling hydrocarbon (propane, butane, pentane or hexane) is injected into conduit 5 via recycle conduit 6 which may be augmented with make-up low-boiling hydrocarbon via conduit 7. Mixing of the hydrocarbon with the bottoms product may be advantageously accomplished by injecting the low-boiling hydrocarbon at the impeller of a pump (not shown). The mixture of low-boiling hydrocarbon and pyridines proceeds through cooler 8 via conduit 5 to separator 9 wherein the precipitated polymers are coagulated, settled and withdrawn through conduit 10. A polymer-free mixture of wet pyridines and low-boiling hydrocarbons is withdrawn through conduit 11 to stripping tower 12 wherein the low-boiling hydrocarbon is stripped at reduced pressure and at a maximum temperature of 110° F. The water present in the wet pyridine is removed overhead along with the low-boiling hydrocarbon via conduit 13 to accumulator 14 where the water is separated out and withdrawn through conduit 15. The low-boiling hydrocarbon is withdrawn from accumulator 14 via recycle conduit 6 and is returned to the system via conduit 5 as was hereinbefore described. Provision can be made to reflux a portion of the low-boiling hydrocarbon via conduit 16. Monomeric MVP is removed from stripping tower 12 through conduit 17.

Figure 2:
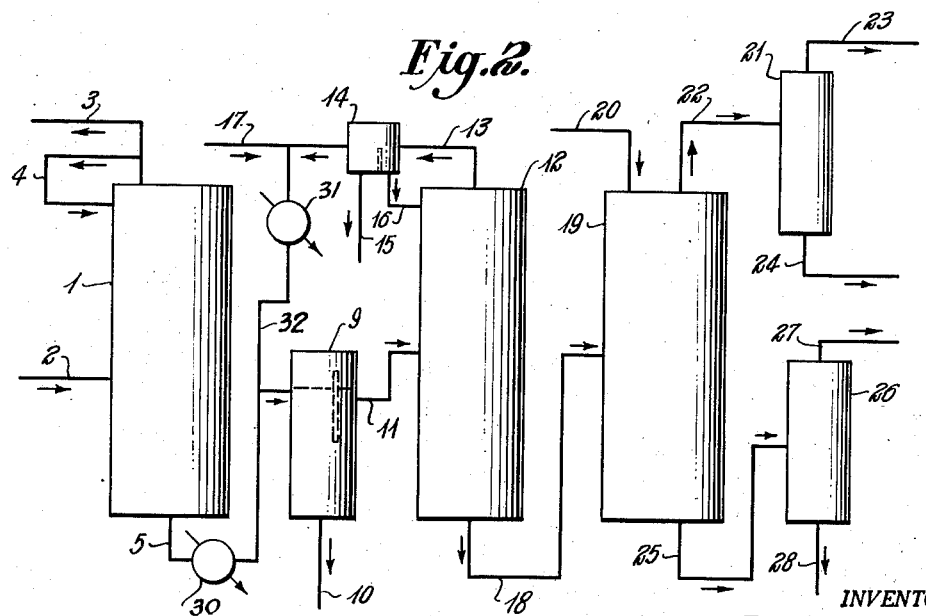
Figure 2 illustrates a process utilizing our invention in which MVP is concentrated by prefractionation followed by liquid-liquid extraction.

Referring to Figure 2, an effluent stream from the dehydrogenation of MEP containing 30–35 percent MVP and 65–70 percent MEP is charged to a prefractionator 1 via conduit 2, wherein substantially pure MEP is removed as overhead product via conduit 3 and is recycled to the dehydrogenator (not shown). As was previously indicated, high temperatures promote polymerization and for that reason the prefractionation and subsequent fractionations, are generally operated under reduced pressures. A portion of the overhead product is returned to the prefractionator 1 as reflux via conduit 4. The MVP concentrate comprising 65–80 percent MVP, 1–5 percent polymer, 1–3 percent water, and the remainder being MEP is removed as bottoms product through conduit 5 and is passed through cooler 30. A low-boiling hydrocarbon, after being chilled in cooler 31, is injected in conduit 5 through conduit 32 and the mixture passed to separator 9. Polymer is removed from the separator via conduit 10 and a polymer-free mixture of MVP, MEP, water and low-boiling hydrocarbon is removed from the separator 9 via conduit 11 and is charged to stripping tower 12, wherein the low-boiling hydrocarbon and the water are stripped from the pyridine overhead through conduit 13 to accumulator 14. Water is separated from the low-boiling hydrocarbon in the accumulator and is withdrawn via conduit 15. Part of the low-boiling hydrocarbon from the accumulator is returned to the stripper 12 via conduit 16 as reflux. The low-boiling hydrocarbon from the accumulator is injected into conduit 32 and returned to the separator 9 as was hereinbefore described. Provision is made for adding make-up low-boiling hydrocarbons to conduit 32 via conduit 17. A dry polymer-free mixture of MVP and MEP is withdrawn from the kettle of column 12 via conduit 18 and is charged to extraction tower 19, wherein the pyridine mixture containing 65–80 percent MVP is contacted countercurrently with carbonated water which is introduced into the extraction tower via conduit 20. A raffinate phase containing MVP along with some water and carbon dioxide is removed from this extraction tower to a stripper 21 via conduit 22. Water and carbon dioxide are stripped from the MVP under reduced pressure and are removed from stripper 21 through conduit 23. The stripper product is dry 95+ percent MVP. The MEP entering the extraction tower is dissolved in the carbonated water and this extract phase is removed from tower 19 through conduit 25 to a stripper tower 26 wherein the solvent ($CO_2$+water) is removed via conduit 27 and the MEP is removed via conduit 28 and is recycled to the dehydrogenation unit.

While carbonated water is shown as the solvent in this embodiment of the invention, the invention is not limited to the use of this solvent. Any solvent having selectivity for MVP or MEP would be suitable for this separation step and is within the scope of the invention. Such solvents are acidic having a pH no greater than 7, but not less than 2. These acids may be organic or inorganic acids or they may be strong acidic salts. The acid can be buffered if it is so desired.

As a still further embodiment (not illustrated) of the manner in which our invention may be utilized in liquid-liquid extraction, the effluent from the dehydrogenation of MEP may be charged directly to the extractor (tower 19 of Figure 2) and the raffinate treated with a low-boiling hydrocarbon to separate and coagulate the polymer. The low-boiling hydrocarbon and water can then be stripped from the monomer at low pressure.

Figure 3:
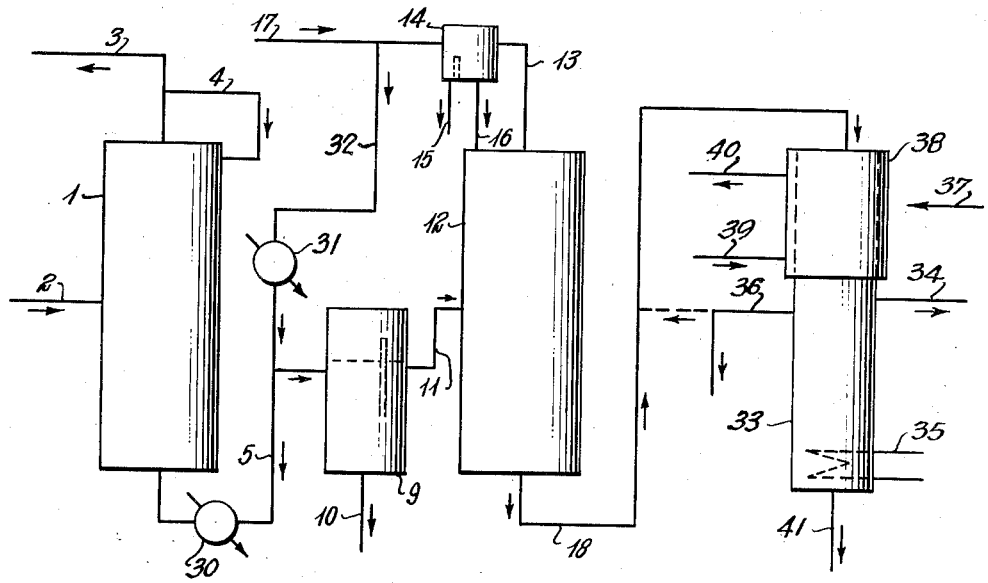
Figure 3 illustrates a process utilizing our invention in a continuous crystallization process wherein the MVP is concentrated by prefractionation.

Referring now to Figure 3, prefractionator 1, separator 9, stripping tower 12, and the appending conduits, etc., are the same, operate in the same manner and are identified by the same numerals as described for Figure 2.

The MVP concentrate from stripping tower 12 is charged via conduit 18 to a continuous crystallizer 33 wherein the mixed pyridines are chilled, causing the MVP to crystallize. Mother liquor is removed by filtration from the crystallizer through conduit 34 and may be recycled to the fractionator 1. The crystals of MVP settle in the crystallizer and are melted at the bottom of the crystallizer by heat supplied through heater 35. A portion of the molten MVP moves up the column and counter-currently washes the settling crystals. The wash liquid is filtered off through conduit 36 and recycled to the chilled section 37 of the crystallizer 33. This chilled section is jacketed with heat exchanger 38 which is provided with an inlet conduit 39 and outlet conduit 40 and through which a coolant is pumped. The bulk of the molten MVP at the bottom of crystallizer 33 is removed through conduit 41 as 95+ percent MVP product.

Figure 4:
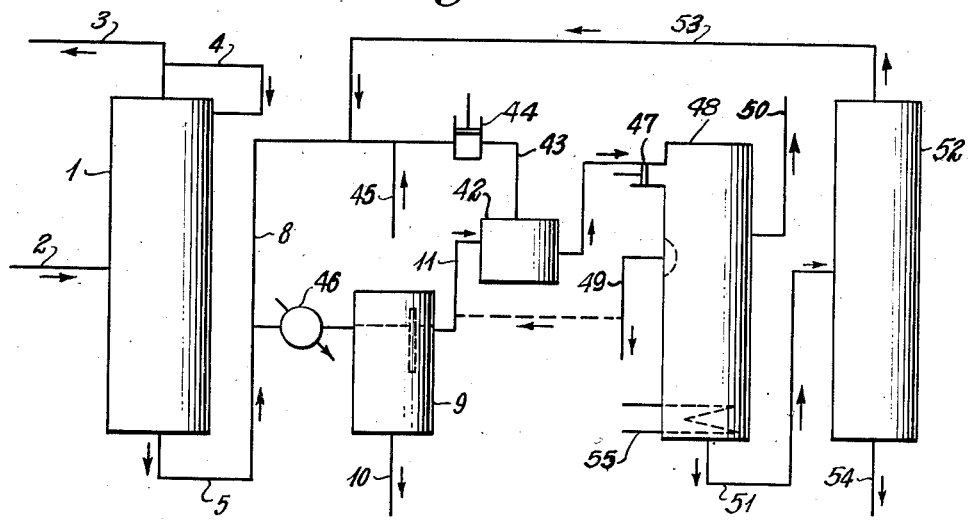
Figure 4 illustrates a process similar to the process of Figure 3 utilizing our invention in a continuous crystallization process wherein the low-boiling hydrocarbon is propane and the heat of vaporization of the liquid propane is taken from the MVP-MEP mixture to cool the mixture and cause the crystallization of the MVP.

Referring to Figure 4, the prefractionator 1, the separator 9 and the appending conduits, cooler, etc., are the same, operated in the same manner, and are identified by the same numerals as they were in Figures 2 and 3. Propane is used as the low-boiling hydrocarbon in illustrating this embodiment.

The polymer-free concentrate from separator 9 is transferred to chiller 42 via conduit 11. The propane is allowed to flash from the chiller 42 through conduit 43 to compressor 44. The propane is compressed in compressor 44 and is recycled to the cooler 46 via conduit 8. Make-up propane can be added through conduit 45. Upon flashing, the propane cools the pyridine mixture, causing the MVP to crystallize.

A slurry of MVP crystals is transferred to a piston 47 or other injection means which forces the slurry into the crystallizer 48 wherein the MVP is purified essentially as described for the process of Figure 3 in crystallizer 33. The molten MVP used for wash is filtered off through conduit 49 and can be recycled to the chiller 42. The mother liquor is filtered off through conduit 50 and is stripped of propane in a column (not shown) and the resulting mixture of pyridines is recycled to prefractionator 1 while the propane is returned to the system via conduit 8. The bulk of the molten MVP of 95+ percent is withdrawn through conduit 51 from the bottom of crystallizer 48 and is charged to stripper 52 wherein the small percentage of propane remaining is removed via conduit 53 at low temperature (100–110° F.) and at a pressure of 10 mm. of mercury or less. The 95+ percent MVP product is removed from the bottom of the stripper 52 through conduit 54.

A fractional crystallization method as fully disclosed in application of D. L. McKay, Serial No. 367,424, filed on July 13, 1953, can be advantageously used with the polymer separation method of this invention. The crystallizer of the copending application of D. L. McKay, supra, and also disclosed in copending application of D. L. McKay, Serial No. 367,850, filed on August 24, 1953, is essentially an upright elongated column comprised of three principal sections, namely, a scraped surface chiller, a filter section, and a crystal purification section. The chiller section is surrounded by an annular jacket which is provided with means for pumping a refrigerant through said jacket. In this section, one fraction of a mixture of organic compounds will crystallize and begin to descend through the column. The filter section is disposed beneath the chiller section between the said chiller section and the purification section. In this filtering section, filtering means are provided for separating liquid from the crystals and removing liquid from the column. Scrapers are provided in this section for removing crystals from the filtering surface. A means for supplying heat in the purification section is provided. The crystals are melted in this purification section and some of the molten material will rise countercurrent to the descending crystals. This rising material acts as an internal or displaced reflux and washes the descending crystals. The ascending liquid rises to the filtering section where it is removed. The bulk of the liquid resulting from melting the crystals is removed from the bottom of this section as reflux.

Journaled within the upright elongated column is a vertically disposed shaft. Within the chiller section of the column and closely spaced to the walls thereof are a plurality of scrapers which serve to keep the wall free of crystal deposits. These scrapers are attached to the vertically disposed shaft by suitable means. The aforementioned filter scrapers are also attached to the vertical shaft. In the purification section are a plurality of stirrers attached to the said shaft. As the crystals are formed and descend in the column, the journal shaft is made to rotate by suitable means and thereby rotating the scrapers and stirrers.

To further illustrate our invention, the following specific example is given:

A MVP–MEP mixture containing 65 weight percent MVP, 30 weight percent MEP and 5 weight percent polymer was mixed with an equal volume of normal pentane at 40° to 60° F. The polymer precipitated and, in a few minutes, agglomerated. The liquid phase was decanted and vacuum flashed at 10 mm. mercury pressure. The initial kettle temperature was 10° F. and was gradually increased to 110° F. to complete the flashing. The kettle product was a MEP–MVP mixture and was essentially free (less than 0.5 percent) of polymer and pentane.

The process of this invention provides for a relatively simple method for the removal of polymers from a heterocyclic nitrogen monomer concentrate and the subsequent recovery of the monomer substantially quantitatively.

We have illustrated four embodiments of our process, along with one specific example, and it should be understood that these were illustrations only. It will be obvious to those skilled in the art that our invention can be embodied in many processes and there can be many variations and modifications made in the embodiments shown without varying from the spirit or scope of our invention. For example, in our preferred embodiment and our example we have used approximately an equal volume of low boiling hydrocarbon to concentrate for economical reasons. However, any amount of low boiling hydrocarbon is excess of 1/10 of the volume of the concentrate is operable.

We claim:

1. In the process wherein heterocyclic nitrogen monomers are prepared by dehydrogenation of alkyl substituted heterocyclic compounds and the resulting monomer recovered by separation, the improvement comprising passing the effluent from the dehydrogenation zone to a first fractionation zone wherein the monomeric materials containing polymeric material dissolved therein are concentrated by removing low boiling components therefrom, adding a low-boiling saturated hydrocarbon to the concentrate thereby causing polymeric material present in said concentrate to precipitate, removing the resulting precipitate, and recovering the concentrate from the low boiling hydrocarbon.

2. In the purification of polymerizable heterocyclic nitrogen compounds, the process comprising removing low boiling components by prefractionation a mixture of organic compounds comprising polymerizable heterocyclic nitrogen compounds containing polymeric material dissolved therein at reduced pressures, thereby concentrating the polymerizable material, adding a low-boiling saturated hydrocarbon to the concentrate and thereby causing said polymeric material present to precipitate out of the concentrate, removing the resulting coagulum, and stripping the low-boiling hydrocarbon from the concentrate at reduced pressures.

3. In the purification of polymerizable heterocyclic nitrogen compounds, the process comprising removing low boiling components by fractionating a mixture of organic compounds comprising polymerizable heterocyclic nitrogen compounds containing polymeric material dissolved therein in the presence of a polymer inhibitor at a pressure less than atmospheric, thereby concentrating the polymerizable material, adding to said concentrate a saturated hydrocarbon of 3 to 6 carbon atoms, said hydrocarbons causing said polymeric material present in the concentrate to precipitate and coagulate out, removing the resulting precipitate, and stripping the hydrocarbon from the concentrate at a pressure less than 10 mm. of mercury.

4. In the purification and substantially quantitative recovery of polymerizable heterocyclic nitrogen monomers the process comprising the removal of low boiling components by prefractionation of a mixture of organic compounds comprising polymerizable heterocyclic nitrogen compounds containing polymeric material dissolved therein at reduced pressures thereby concentrating the polymerizable material, recovering and recirculating the non-polymerizable material, adding to said concentrate of polymerizable material a saturated hydrocarbon containing 3 to 6 carbon atoms, said hydrocarbon causing said polymeric material present in said concentrate of polymerizable material to precipitate and coagulate, decanting concentrate and hydrocarbon, stripping the hydrocarbon from the concentrate at reduced pressures, condensing the stripped hydrocarbon and recirculating to precipitation step, separating the polymer-free concentrate into fractions, and recirculating unpolymerizable material.

5. In the recovery of high purity, polymer-free polymerizable heterocyclic nitrogen monomers selected from the group consisting of vinylpyridines, divinylpyridines, alkyl and alkenyl substituted vinyl and divinylpyridines wherein said substituted radical contains 1 to 4 carbon atoms, vinylquinolines, divinylquinolines, alkyl and alkenyl substituted vinyl and divinylquinolines wherein said substituted radical contains 1 to 4 carbon atoms, the process comprising reacting a non-polymerizable heterocyclic nitrogen material so as to produce a mixture of the said non-polymerizable material and a polymerizable heterocyclic nitrogen material having polymeric dissolved therein, fractionating said mixture at reduced pressures thereby removing a portion of the non-polymerizable material of lower boiling range and thereby concentrating the polymerizable material, recovering said non-polymerizable material and recirculating same to reaction step, adding to said concentrate of polymerizable material a saturated hydrocarbon containing 3 to 6 carbon atoms, whereby said polymers present in said concentrate, will precipitate and coagulate, separating said precipitate from the concentrate, stripping the hydrocarbon from the concentrate at reduced pressures, condensing the hydrocarbon and recirculating to precipitation step, separating non-polymerizable and polymerizable materials, and returning non-polymerizable material to reaction step.

6. The process of claim 5 wherein the final separation comprises extracting the non-polymerizable material with an acidic solvent.

7. The process of claim 5 wherein the final separation comprises liquid-liquid extraction wherein the concentrate is washed with a selective solvent.

8. The process of claim 7 wherein the selected solvent is carbonated water.

9. The process of claim 5 wherein the non-polymerizable material is 5-ethyl-2-methylpyridine, the polymerizable material is 2-methyl-5-vinylpyridine, the reaction comprises dehydrogenation of the 5-ethyl-2-methylpyridine in presence of a suitable catalyst, and the hydrocarbon is normal propane.

10. In the purification of polymerizable heterocyclic nitrogen compounds containing polymeric material dissolved therein, the process comprising prefractionating a mixture of organic compounds comprising polymerizable heterocyclic nitrogen compounds in the presence of a polymerization inhibitor at a pressure less than atmospheric thereby concentrating the polymerizable material by removal of low boiling components, adding to said concentrated polymerizable material a saturated hydrocarbon of 3 to 6 carbon atoms thereby causing polymeric material present in the concentrate to precipitate out, removing the resulting precipitate from said concentrate, flashing substantially all of the hydrocarbon from the concentrate, separating the polymerizable material from the unpolymerizable in the concentrate by fractional crystallization, and fractionating the resulting dry and polymer-free concentrate at a pressure less than 10 millimeters of mercury to remove the remaining trace of said hydrocarbon.

References Cited in the file of this patent

UNITED STATES PATENTS

| | | |
|---|---|---|
| 2,469,295 | Meier et al. | May 3, 1949 |
| 2,556,845 | Kauffman | June 12, 1951 |
| 2,611,769 | Hays | Sept. 23, 1952 |

FOREIGN PATENTS

| | | |
|---|---|---|
| 488,593 | Canada | Dec. 2, 1952 |